US009514374B2

(12) United States Patent
Artan et al.

(10) Patent No.: US 9,514,374 B2
(45) Date of Patent: Dec. 6, 2016

(54) SMART FACE REDACTION IN NEAR INFRARED VEHICLE WINDSHIELD IMAGES

(71) Applicant: Xerox Corporation, Norwalk, CT (US)

(72) Inventors: Yusuf Oguzhan Artan, Demetevler/Ankara (TR); Peter Paul, Penfield, NY (US); Mark Cantelli, Germantown, MD (US)

(73) Assignee: Xerox Corporation, Norwalk, CT (US)

( * ) Notice: Subject to any disclaimer, the term of this patent is extended or adjusted under 35 U.S.C. 154(b) by 82 days.

(21) Appl. No.: 14/302,610

(22) Filed: Jun. 12, 2014

(65) Prior Publication Data
US 2015/0363655 A1    Dec. 17, 2015

(51) Int. Cl.
| | |
|---|---|
| *G06K 9/00* | (2006.01) |
| *G06K 9/46* | (2006.01) |
| *G06K 9/62* | (2006.01) |
| *G06T 7/00* | (2006.01) |
| *H04N 5/33* | (2006.01) |
| *G08G 1/04* | (2006.01) |
| *G08G 1/017* | (2006.01) |

(52) U.S. Cl.
CPC ....... *G06K 9/00832* (2013.01); *G06K 9/00228* (2013.01); *G06K 9/00785* (2013.01); *G06K 9/00838* (2013.01); *G06K 9/4638* (2013.01); *G06K 9/6202* (2013.01); *G06K 9/6206* (2013.01); *G06K 9/6267* (2013.01); *G06T 7/0044* (2013.01); *G06T 7/0081* (2013.01); *G08G 1/0175* (2013.01); *G08G 1/04* (2013.01); *H04N 5/33* (2013.01); *G06T 2207/10004* (2013.01); *G06T 2207/20076* (2013.01); *G06T 2207/20132* (2013.01); *G06T 2207/30268* (2013.01)

(58) Field of Classification Search
None
See application file for complete search history.

(56) References Cited

U.S. PATENT DOCUMENTS

| | | | | |
|---|---|---|---|---|
| 2002/0044674 A1* | 4/2002 | Pavlidis | ............. | G06K 9/00228 382/118 |
| 2005/0190953 A1* | 9/2005 | Nagahashi | ......... | G06K 9/00248 382/118 |
| 2008/0175438 A1* | 7/2008 | Alves | ................... | G08G 1/0175 382/105 |
| 2011/0164789 A1* | 7/2011 | Robert | ............... | G06K 9/00798 382/104 |
| 2011/0293141 A1* | 12/2011 | Robert | ............... | G06K 9/00785 382/103 |
| 2012/0069183 A1* | 3/2012 | Aoki | .................... | G07B 15/063 348/148 |
| 2012/0147194 A1* | 6/2012 | Wang | ....................... | H04N 5/33 348/164 |
| 2013/0051625 A1 | 2/2013 | Fan et al. | | |
| 2013/0141574 A1 | 6/2013 | Dalal et al. | | |
| 2013/0336538 A1 | 12/2013 | Skaff et al. | | |

OTHER PUBLICATIONS

Cantelli, "Xerox Vehicle Occupancy Detection System", Aug. 1, 2013, Denver. Retrieved from http://ibtta.org/sites/default/files/documents/2013/Denver/-Cantelli_Mark.pdf.*
Birch et al., "Automated vehicle occupancy monitoring", Aug. 2004, SPIE Optical Engineering vol. 43, Issue 8.*

(Continued)

*Primary Examiner* — Jason Heidemann
(74) *Attorney, Agent, or Firm* — Fay Sharpe LLP

(57) ABSTRACT

A system and method for redaction of faces in a windshield within an image that includes detecting a windshield within the captured image via a selected detection process, extracting a windshield region from the detected windshield within the image, and selectively applying an obscuration process to at least a portion of the extracted windshield region. A redacted image is then generated obscuring the face or faces in the windshield using the selectively applied obscuration process.

17 Claims, 9 Drawing Sheets

(56) References Cited

OTHER PUBLICATIONS

Frome et al., "Large-scale Privacy Protection in Google Street View", 2009, IEEE International Conference on Computer Vision.*
Senior,"Privacy Enablement in a Surveillance System", 2008, IEEE ICIP 2008, pp. 1680-1683.*
Artan et al., Occupancy Detection in Vehicles Using Fisher Vector Image Representation, Dec. 20, 2013.*
Senior et al., Privacy Protection and Face Recognition, 2011, Handbook of Face Recognition, pp. 671-691.*
Senior, "Privacy Protection in a Video Surveillance System", 2009, Springer-Verlag, 35-47.*
U.S. Appl. No. 13/859,047, filed Apr. 9, 2013, entitled "Windshield Localization for Occupancy Detection for Managed Lane Enforcement," by Xu et al.
U.S. Appl. No. 14/245,319, filed Apr. 4, 2014, entitled "Robust Windshield Detection Via Landmark Localization," by Xu et al.
Pietro Perona and Jitendra Malik, "Scale-space and edge detection using anisotropic diffusion," Electrical Engineering and Computer Science Department, University of California at Berkley, California, Dec. 20, 1988.
Xiangxin Zhu and Deva Ramanan, "Face Detection, Pose Estimation, and Landmark Localization in the Wild," 2012 CVPR.
Jan J. Koenderink, "The Structure of Images," *Biol. Cybern.*, vol. 50, pp. 363-370, 1984.
Robert Hummel and Robert Moniot, "Reconstructions from Zero Crossings in Scale Space," *IEEE Transactions on Acoustics, Speech, and Signal Processing*, vol. 37, No. 12, Dec. 1989, pp. 2111-2130.

* cited by examiner

SMART FACE REDACTION IN NEAR INFRARED VEHICLE WINDSHIELD IMAGES

CROSS-REFERENCE TO RELATED APPLICATIONS

This application is related to co-pending U.S. Patent Application Publication No. 2015/0286883 A1, published Oct. 8, 2015, entitled "ROBUST WINDSHIELD DETECTION VIA LANDMARK LOCALIZATION," the disclosure of which is incorporated by reference in its entirety herein.

BACKGROUND

The present disclosure relates to the image analysis arts, traffic enforcement arts, image modification arts, privacy protection arts, facial recognition arts, and more particularly to filtering or redaction of faces in windshield images.

In order to manage ever-increasing traffic numbers, special lanes are introduced that allow only traffic with more than a certain number of occupants inside a vehicle. These managed lanes include carpool, diamond, or High Occupancy Vehicle (HOV) lanes that are intended to reduce the total number of cars (for a given number of people) on the highway and thus to speed up travel. The overall benefits are obvious in multiple areas: the managed lanes reduce traffic congestion, reduce wasted commuting time, reduce fuel consumption, and decrease pollution. Managed lanes also include High Occupancy Tolling (HOT) lanes where a single occupant vehicle can use the managed lane upon payment of a toll. The toll is often dynamically set based on real-time traffic congestion to maintain a minimum average vehicle speed in the managed lane. Managed lanes, such as the aforementioned HOV or HOT lanes, are typically the left most lanes of a highway and are often denoted by diamond markings on the pavement within the lanes and/or signage. Sometimes they are separated from the general-purpose lanes using barriers. Some managed lanes require at least two vehicle occupants, denoted as a "2+" lane, and other managed lanes require at least three vehicle occupants, denoted as a "3+" lane.

In order to be effective and maintain integrity within the system, adherence to the occupancy numbers has to be enforced. Since managed lanes generally give a clear advantage in terms of travel time, people are tempted to cheat the system and use the lane even if their vehicle does not carry the sufficient number of occupants (or is otherwise ineligible) required. This tendency to cheat sometimes also includes efforts to avoid detection, including the use of dummies or mannequins to simulate additional occupants.

To enforce the rules of managed lanes, current practice requires dispatching law enforcement officers at the side of HOV/HOT lanes to visually examine passing vehicles. This method is expensive, difficult, potentially unsafe, and ultimately ineffective as few violators are actually caught and ticketed. An alternate method of monitoring managed lanes is image-based automatic enforcement which requires identification and classification of image features (e.g., faces, seats, seat belts, etc.) behind a windshield that are visible to the camera to distinguish a driver+passenger configuration vs. a driver only configuration. This method may be dependent upon camera placement and trigger timing to obtain a clear image of the interior of a vehicle. In most locations, it is not possible to aim the camera such that its field of view is tightly focused on only the windshield of all oncoming cars. The location of the windshield in captured images will vary from car to car depending on driver behavior and vehicle design, thus reducing the effectiveness of such an image based approached. As such, accurate localization of the windshield region from a captured image is required to identify violators in managed lanes.

One approach for identifying the location of a windshield region is set forth in commonly assigned U.S. Pat. No. 8,971,579 B2, issued Mar. 3, 2015 wherein a target vehicle within a captured image can be identified and localized based on prior knowledge of geometric and spatial relationships. Objects of interest on the target vehicle can then be identified and utilizing a priori knowledge of the relative geometric relationships between the identified objects, the area of the image containing the windshield of the target vehicle can be identified and localized for downstream processing to detect vehicles in violation of HOV/HOT lane requirements or other violations, such as seat belt requirements.

Currently, however, the law enforcement officers enforce the day-to-day overseeing of managed lane regulations by manual observations. Unfortunately, current practice is expensive and more importantly, ineffective. The aforementioned automatic camera (image-based) approach replaces this manual enforcement approach. Certain issues arise when using image capturing enforcement tools, primarily fulfilling privacy requirements of drivers and occupants. During image-based enforcement, there is a need to redact the face regions in the collected images to respect the privacy of the commuters. Concurrent with the redaction of faces from the images, however, is the need for the images to have enough detail preserved so that a person viewing the images can easily count the number of people within the vehicle. Law enforcement need to be able to count the number of people and the violator needs to be provided with imagery documenting their violation.

Contemporaneous facial redaction methodologies in the aforementioned camera system are typically based on face detection algorithms. Initially, region of interest (i.e., face) is detected using one of the state-of-the-art face detection techniques, and then the face region is redacted accordingly. Unfortunately, face detection based redaction techniques can perform poorly for arbitrary viewing angles, facial pose variation, occluded and partially occluded faces, poor contrast and low-resolution imagery.

Accordingly, there remains a need for an efficient, fast, and inexpensive facial redaction method allowing for the display of front view camera images anonymously.

INCORPORATION BY REFERENCE

The following references, the disclosures of which are incorporated herein by reference in their entirety, are mentioned:

U.S. Pat. No. 8,611,608 B2, issued Dec. 17, 2013, by Fan et al., entitled "FRONT SEAT VEHICLE OCCUPANCY DETECTION VIA SEAT PATTERN RECOGNITION."

U.S. Pat. No. 8,811,664 B2, issued Aug. 19, 2004, by Dalai et al., entitled "VEHICLE OCCUPANCY DETECTION VIA SINGLE BAND INFRARED IMAGING."

U.S. Pat. No. 8,824,742 B2, issued Sep. 2, 2014, by Skaff et al., entitled "OCCUPANCY DETECTION FOR MANAGED LANE ENFORCEMENT BASED ON LOCALIZATION AND CLASSIFICATION OF WINDSHIELD IMAGES."

U.S. Pat. No. 8,971,579 B2, issued Mar. 3, 2015, by Xu et al., entitled "WINDSHIELD LOCALIZATION FOR OCCUPANCY DETECTION."

U.S. Patent Application Publication No. 2015/0286883 A1, published Oct. 8, 2015, by Xu et al., entitled "ROBUST WINDSHIELD DETECTION VIA LANDMARK LOCALIZATION."

Pietro Perona and Jitendra Malik, "Scale-space and edge detection using anisotropic diffusion," Electrical Engineering and Computer Science Department, University of California at Berkley, Calif., Dec. 20, 1988.

Xiangxin Zhu and Deva Ramanan, "Face Detection, Pose Estimation, and Landmark Localization in the Wild," 2012 CVPR.

Jan J. Koenderink, "The Structure of Images," *Biol. Cybern.*, Vol. 50, pp. 363-370, 1984.

Robert Hummel and Robert Moniot, "Reconstructions from Zero Crossings in Scale Space," *IEEE Transactions on Acoustics, Speech, and Signal Processing*, Vol. 37, No. 12, December 1989, pp. 2111-2130.

BRIEF DESCRIPTION

In accordance with one aspect of the exemplary embodiment, a system configured to perform redaction of a face in a windshield within an image includes a data processing device including a processor, and a processor-usable medium embodying computer code, the processor-usable medium in communication with the data processing device, the computer program code comprising instructions executable by the processor and configured for extracting a windshield region from an image captured by an associated image capture device. In addition, the instructions executable by the processor and configured for selectively applying an obscuration process to at least a portion of the extracted windshield region, and generating a redacted image of the captured image in accordance with the selectively applied obscuration process.

According to another aspect, a computer-implemented method for redacting a face in a windshield within an image includes detecting a windshield within an image captured by an associated image capture device via a selected detection process, and extracting a windshield region from the detected windshield within the captured image. The computer-implemented method further includes selectively applying an obscuration process to at least a portion of the extracted windshield region. The computer-implemented method also includes generating a redacted image of the captured image in accordance with the selectively applied obscuration process.

According to one embodiment, the computer-implemented method further includes detecting at least one face via an associated face detection unit within the extracted windshield region, and redacting the at least one detected face in the extracted windshield region prior to the selective application of the obscuration process, wherein the redacted image is generated in accordance with the at least one redacted face and the selectively applied obscuration process.

According to another aspect, a non-transitory computer-usable medium for performing landmark-based image analysis for redacting a face in a windshield within an image, the computer-usable medium embodying a computer program code, the computer program code includes computer executable instructions configured for extracting a windshield region from an image captured by an associated image capture device. The computer program code further includes instructions for selectively applying an obscuration process to at least a portion of the extracted windshield region, and generating a redacted image of the captured image in accordance with the selectively applied obscuration process.

DETAILED DESCRIPTION

Figure 1:
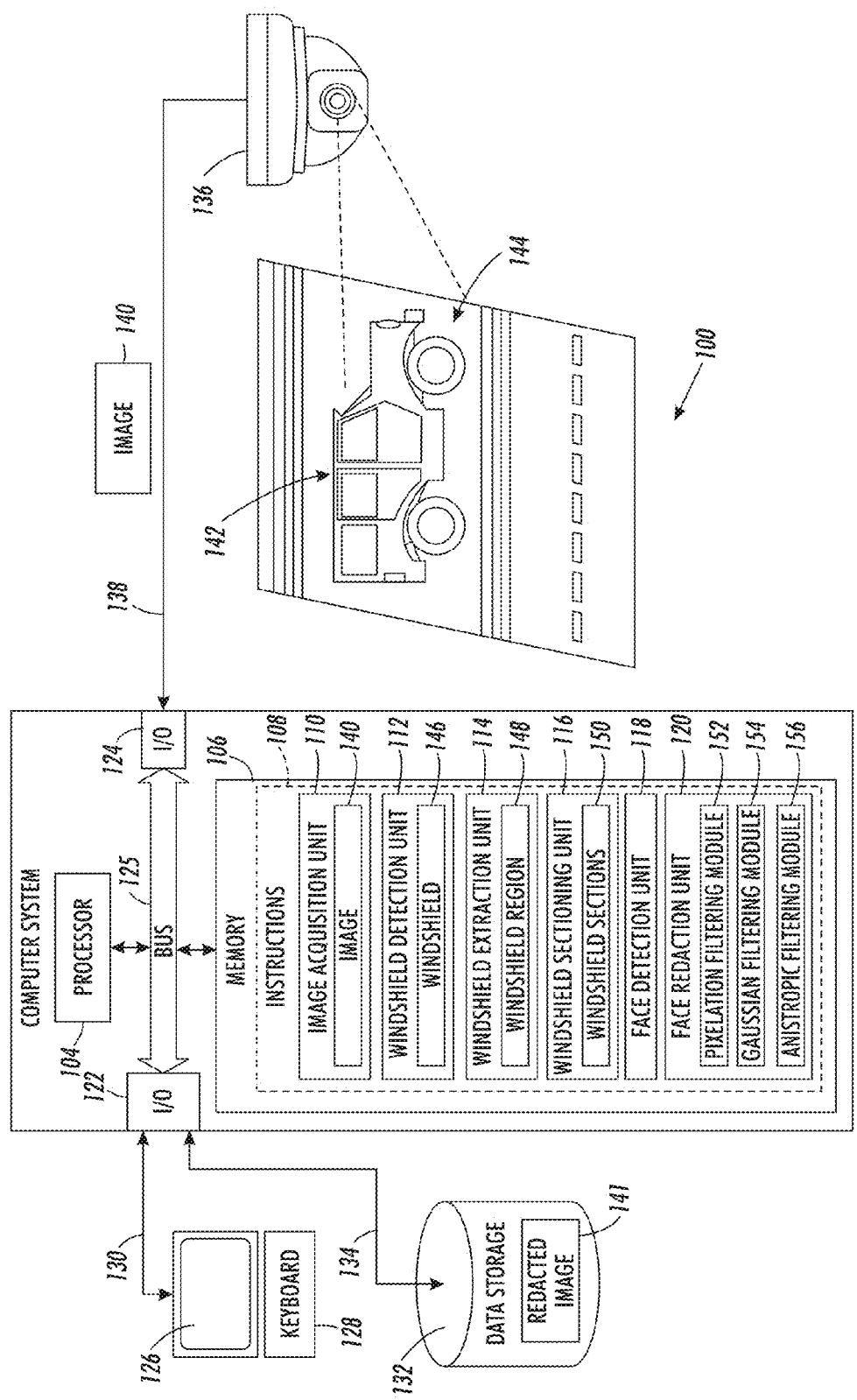
FIG. 1 is a functional block diagram of a face redaction system for windshield images in accordance with one aspect of the exemplary embodiment.

One or more implementations of the subject disclosure will now be described with reference to the attached drawings, wherein like reference numerals are used to refer to like elements throughout.

As described herein, there is provided a method utilizing a camera based imaging system to capture images in the near infrared (NIR) band through the front and side windows of an incoming vehicle. Next, the occupancy detection algorithm examines the images captured by the camera system and determines any HOV/HOT lane violators for law-enforcement officers to take action on. However, the faces of the drivers and passengers should be redacted in order to respect the privacy of the occupants. Faces of the passengers and drivers should be blurred but not disappear since the law-enforcement needs to confirm the number of occupants by viewing the imagery. Further, imagery needs to be supplied to the violator to show what evidence the agency has against the driver—typically a link to a web page that has the imagery.

Face detection represents one possible avenue in the face redaction process, but it typically fails in arbitrary view angles, facial pose variation, occluded and partially occluded faces, poor contrast, and low resolution imagery. Therefore, provided herein is a system and method for redacting/obscuring faces in images captured with the front view camera system. In embodiments contemplated herein, a windshield is detected and extracted via the landmark-based windshield detector of U.S. Patent Application Publication No. 2015/0286883 A1, wherein the landmark points obtained are used to select a particular region (upper part of windshield) to perform filtering. The systems and methods implemented herein may utilize various filtering methods and obscuration techniques, including, for example and without limitation, pixilation, Gaussian (isotropic) filtering, and anisotropic filtering.

In the following, the terms "optimization," "minimization," "maximizing," and similar phraseology are to be broadly construed, as one of ordinary skill in the art would understand these terms. For example, these terms are not to be construed as being limited to the absolute global optimized value, absolute global minimum, absolute global maximum, and so forth. For example, minimization/maximization of a function may employ an iterative minimization/maximization algorithm that terminates at a stopping criterion before an absolute minimum/minimum is reached. It is also contemplated for the optimized, minimum or maximum value to be a local optimized, local minimum or local maximum value.

Referring now to FIG. 1, there is shown a functional block diagram of a system 100 for face redaction/obscuration in windshield images in accordance with one aspect of the subject disclosure. It will be appreciated that the various components depicted in FIG. 1 are for purposes of illustrating aspects of the exemplary embodiment, and that other similar components, implemented via hardware, software, or a combination thereof, are capable of being substituted therein. It will further be appreciated that unless otherwise noted, the terms "redaction" and "obscuration" are used interchangeably and may reference any removal, replacement, or other adjustment to a face or region of an image to prevent determination of the identity of the driver, i.e., maintain the anonymity thereof when output by the systems and methods set forth herein.

As shown in FIG. 1, the face redaction system 100 includes a computer system represented generally at 102, which is capable of implementing the exemplary method described below. It will be appreciated that while shown with respect to the computer system 102, any suitable computing platform may be utilized in accordance with the systems and methods set forth herein. The exemplary computer system 102 includes a processor 104, which performs the exemplary method by execution of processing instructions 108 that are stored in memory 106 connected to the processor 104, as well as controlling the overall operation of the computer system 102.

The instructions 108 include an image acquisition unit 110 operable to acquire an image 140 of a vehicle 142 transiting a High Occupancy Vehicle (HOV) lane 144 from an associated image capture device 136 via a suitable communications link 138, e.g., a video camera, still camera, etc. Suitable examples of such image capture devices 136 may include, for example, CMOS, CCD, near-infrared cameras, infrared cameras, far infrared cameras, and other types of cameras capable of recording or capturing moving images. It will be appreciated that when the systems and methods described herein are implemented in an HOV environment 144, care must be taken to prevent distraction of the drivers of the vehicles 142, e.g., flashes in the visible wavelengths may be distracting, produce glare off of windshields 146 reducing effectiveness, and the like. To prevent such occurrences, various embodiments contemplated herein may use an image capture device 136 configured to utilize non-visible wavelengths, e.g., infrared, near infrared, ultraviolet. It will further be appreciated that enforcement may be limited to certain times of day, wherein use of visible light capturing cameras 136 is viable. Accordingly, the systems and methods described herein are suitably configurable for adaptation to images 140 captured via the aforementioned types of devices 136, independent of wavelength used to capture such images 140.

According to one embodiment, the image capture device 136 may be positioned at a suitable height above ground level to capture an image 140 of the vehicle 142 as it transits along a thoroughfare, highway, or the like. It will be appreciated that while illustrated in FIG. 1 as being directly coupled to the computer system 102, the image capture device 136 may be in communication with the computer system 102 via a communications network (not shown), such as, for example, a virtual local area network, a wide area network, a personal area network, a local area network, the Internet, an intranet, or any suitable combination thereof. The communications link 138 may be implemented as, for example, the public-switched telephone network, a proprietary communications network, infrared, optical, or other suitable wired or wireless data communications channel.

The image capture device 136 may be implemented as a near infrared (NIR) camera in communication with the image acquisition unit 110 to facilitate capturing or otherwise receiving images 140 of vehicles 142. It will be appreciated that in accordance with the systems and methods set forth herein, specific requirements in terms of spatial or temporal resolutions may not be needed. It will further be appreciated that the systems and methods set forth herein are capable of operations using a plurality of different pixel resolutions and different frame rates.

The system 102 may further include a windshield detection unit 112 implemented as hardware, one or more instructions 108, a combination of hardware and software, or the like. The windshield detection unit 112 is configured to obtain sample images of target vehicles, manually designate a number of landmarks (e.g., thirteen) around a windshield region of the vehicle, build a computer model based on the sample images that finds landmark points based on the relative locations of the landmarks in the sample images, analyzes an image of a target vehicle using the computer model to determine one or more possible locations for each landmark, selects a most probable location for each landmark using spatial constraints, generates a ground truth image by manually selecting the windshield area of the target vehicle, compares the manually selected windshield area to the area bounded by the landmarks selected in to generate an overlap classification score, selects a threshold number for the overlap score that maximizes windshield identification, run the computer model on incoming images of target vehicles and cropping all identified candidate windshield areas exceeding the threshold, and transmit the cropped windshield areas to the windshield extraction unit 114 for further processing.

As illustrated in FIG. 1, the system 102 may include a windshield extraction unit 114, implemented as hardware, software, a distinct process or portion of the processor 104, or the like. The windshield extraction unit 114 may be configured to extract a windshield region 148 from the detected windshield 146 in which one or more occupants of the vehicle 142 may be visible. As shown in detail with respect to FIG. 2C, discussed below. According to one example implementation, the window extraction unit 114 extracts a window region 148 from the detected or identified location of the windshield 146 by the windshield detection unit 112. The windshield region 148 may be the same size as the windshield 146, or smaller in size so as to narrow the amount of image 140 that must be analyzed for faces (face detection) or likely to include one or more faces. The windshield detection unit 112 and windshield extraction unit 114 are implementations of the methodology and algorithms presented in co-pending U.S. Patent Application Publication No. 2015/0286883 A1.

In one example embodiment, the computer system 102 may further include a windshield sectioning unit 116, implemented as hardware, software, a distinct process or portion of the processor 104, or the like. The windshield sectioning unit 116 may be configured to section or divide the extracted windshield region 148 into various windshield sections 150, each of which may individually analyzed or processed in accordance with their respective location on the windshield region 148. For example, the sections 150 may correspond to a driver side section, a passenger side section, a top portion, a bottom portion, a quadrant, or the like. FIG. 2C, discussed below, provides an example illustration of two such sections, an upper section or portion 149 and a lower section or portion 151.

It will be appreciated that the aforementioned sectioning unit 116 may not be implemented in other embodiments of the systems and methods described herein. That is, in another example embodiment, the sectioning of the extracted windshield region 148 into sections 150 is not required, as the face redaction unit 118 (discussed below) may utilize an obscuration process that provides maximum obscuration at the top of the windshield region 148 and gradually reduces the obscuration to minimal or no obscuration at the bottom of the windshield region 148. Such an embodiment maintains the privacy of the vehicle's occupant (faces unviewable) while allowing an operator to clearly see the bodies of the driver and passenger for enforcement purposes. Other techniques and obscuration processes are discussed in greater detail below.

Figure 2A:
FIGS. 2A-2C are images depicting an original image and subsequent windshield identification and extraction in accordance with one embodiment of the subject disclosure.
Figure 2B:
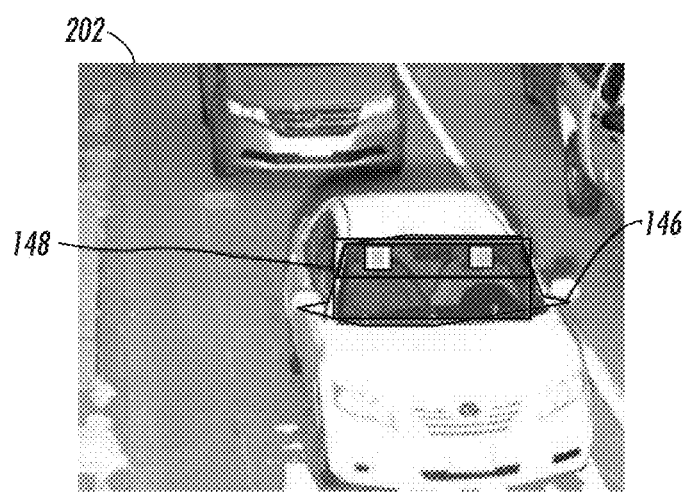
Figure 2C:
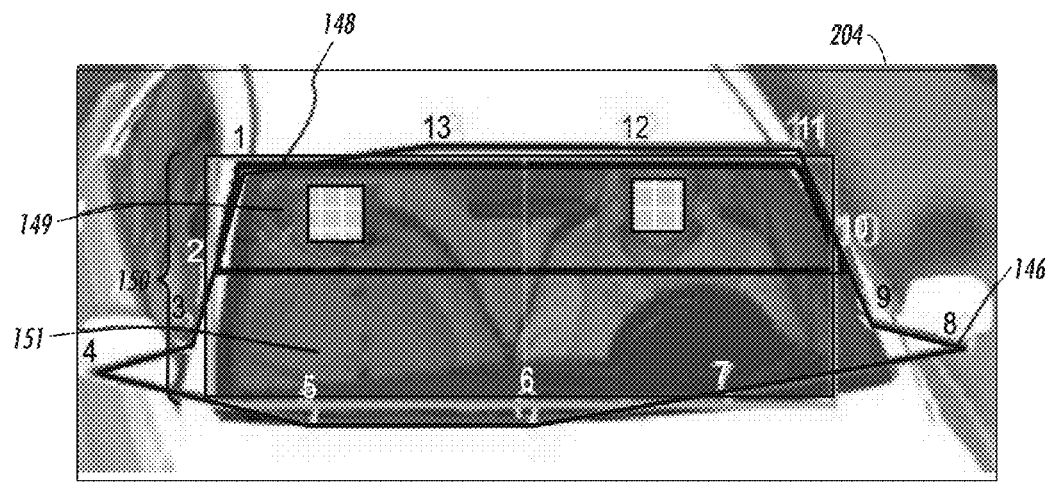

FIGS. 2A-2C illustrate the operations of the windshield detection unit 112, the windshield extraction unit 114, and the windshield sectioning unit 116 as discussed below in accordance with one embodiment of the subject disclosure, aforementioned windshield detection algorithm in operation with respect to the subject embodiments. FIG. 2A shows an original image 200. FIG. 2B illustrates an image 202 depicting an operation of the windshield detection algorithm, such that the front windshield 146 is detected, with the extracted windshield region 148 illustrated by the rectangular box. FIG. 2C shows an image 204 wherein a dark trapezoidal shape shown in black pixels denotes the upper windshield region 149 which typically contains any faces of the driver and/or passenger. As illustrated in FIG. 2C, the windshield region 148 may be divided, or sectioned via the window sectioning unit 116, into an upper windshield region/section 149 and a lower windshield region/section 151, wherein the upper windshield region 149 corresponds to the portion of the windshield region 148 most likely to contain the face(s) of the driver and/or passenger. The patterned boxes depicted in FIG. 2C are added in the present disclosure to prevent identification of the occupants of the photographed vehicle in FIGS. 2A-2C and do not constitute operations of the systems and methods described herein.

It will be appreciated that while reference is made hereinafter to the methodology discussed with respect to FIGS. 2A-2C, other methods for detecting a windshield 146 of the vehicle 142 may be utilized in accordance with the systems and methods herein set forth. For example, detection of the windshield may be accomplished via detecting the headlights of the vehicle 142 and using the headlights as reference points for determining the location of the windshield 146. An example of this method is provided in U.S. Pat. No. 8,971,579 B2, issued Mar. 3, 2015, entitled "WINDSHIELD LOCALIZATION FOR OCCUPANCY DETECTION," by Xu et al., the entire disclosure of which is incorporated by reference herein.

Returning to FIG. 1, according to one example embodiment, the computer system 102 may include a face detection unit 118 configured to detect a face anywhere within the extracted windshield region 148. The face detection unit 118 may comprise software instructions executable by the processor 104, may be a separate software/processor combination, or the like. The face detection unit 118 may utilize a suitable facial detection algorithm to detect and isolate a portion of the windshield region 148 containing a face. In the event that a face is detected within the extracted windshield region 148 of the captured image 140, the face may be redacted using one of a plurality of various obscuration techniques, processes, filters, or the like, as discussed below with respect to the face redaction unit 120. It will be appreciated that the system 100 may be implemented without the use of face detection operations via obscuration of windshield sections 150 based on position thereof, thus negating the need to perform such face detection. However, it will be appreciated that implementations or environments may require the use of face detection, particular those HOV lanes 144 in which occupancy is required at 3+, and sectional obscuration may prevent recognition of the presence of additional passengers.

The computer system 102 may further include a face redaction unit 120 configured to perform one or more adjustments or obscurations to a face or portion of a windshield region 148 of a captured image 140. It will be appreciated that the face redaction unit 120 may be resident in instructions 106 stored in memory 108 of the computer system 102 and executable by the processor 104, may be implemented as a specific piece of hardware, a combination of hardware and software, and the like. The face redaction unit 120 may utilize one or more filtering techniques to perform obscuration on a face of a driver and/or passenger in a vehicle 142. Face redaction may be undertaken by the face redaction unit 120 via an obscuration process that varies differently from the top 149 of the windshield region 148 to the bottom 151. In some embodiments, such obscuration may be a factor of 1.0 for the top 149 and 0.0 for the bottom 151. In other embodiments, spatial variation may be implemented, such that obscuration of the top portion 149 begins with a factor of 1.0, transitions linearly or non-linearly downward (0.75 three quarters of the way down the windshield region 148) to 0.5 at the middle of the windshield region 148 and continues transitioning downward to 0.0 for the bottom of the windshield region 148.

Examples of face obscuring or redaction techniques provided in the subject disclosure include a pixilation process (depicted in FIGS. 3A-3D) via a pixilation filtering module 152, a Gaussian process (depicted in FIGS. 4A-4D) via a Gaussian filtering module 154, and anisotropic filtering (depicted in FIGS. 5A-5B) via an anisotropic filtering module 156. It will be appreciated that additional types of obscuration filtering or techniques may be utilized in accordance with the systems and methods disclosed herein, and the aforementioned techniques are presented herein for example purposes only. It will further be appreciated that the aforementioned ability to spatially vary such obscuration processes may be implemented for each of the example filtering techniques discussed below.

Figure 3A:
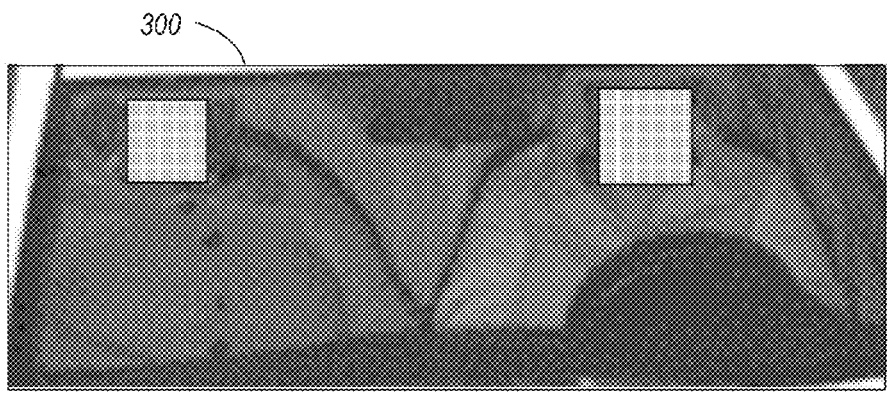
FIGS. 3A-3D are images depicting an original image and subsequent variations on pixilation in accordance with one embodiment of the subject disclosure.
Figure 3B:
Figure 3C:
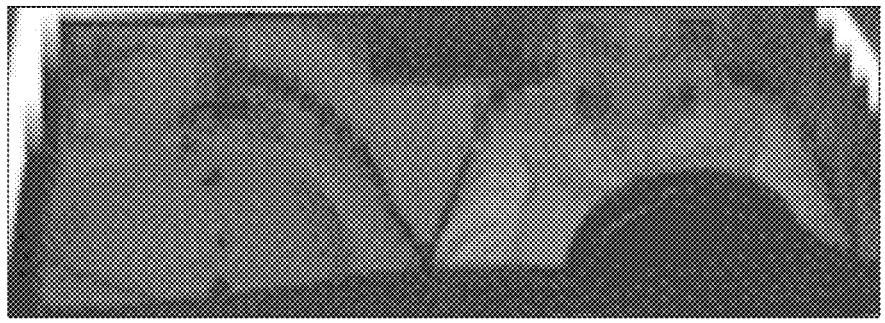

The pixilation filtering module 152 performs a pixilation process illustrated in the obscured images of FIGS. 3A-3D. FIG. 3A shows the original Image, with FIG. 3B depicting the image 300 of FIG. 3A pixilated with a 2×2 mask. It is to be appreciated that the boxes shown in FIG. 3A is intended to prevent the identity of the subjects within the vehicle becoming visible as a result of the subject disclosure and it will be understood that FIG. 3A is intended to represent an undistorted, clear, near infrared image 300 of a windshield region 148 according to the embodiments discussed herein. FIG. 3C depicts the pixilation of the image 300 of FIG. 3A with a 2×4 mask. Similarly, FIG. 3D denotes pixilation of the image 300 of FIG. 3A with a 4×2 mask.

Figure 3D:

Pixilation is the process of replacing the intensity value of each pixel with an average intensity of a mask of certain size. Experimental results indicate that masks of size (in terms of pixels) 2×2, 2×4 and 4×2 works best for the face redaction task. Mask of size 2×2 corresponds to approximately 0.6×0.6 inches in real world dimensions on the object. Masks larger than 2×4 result in heavy degradation of facial features, which is generally undesirable, as enforcement may require redaction of faces coupled with preservation of the general structure of the face. FIG. 3D provides an illustration of heavy degradation in face region structures for mask of size 4×2.

The Gaussian filtering module 154 performs Gaussian blurring, filtering, or low-pass filtering, on a detected face or portion of extracted windshield 148 from a captured image 140. Such a Gaussian process is illustrated in the obscured images of FIGS. 4A-4D. It will be appreciated that in Gaussian filtering, coarser images are obtained by convolving the original image with a Gaussian kernel, h, as shown in Eq. (1).

$$I(x, y) = I_o(x, y) * h(x, y) \quad (1)$$

$$h_g(x, y) = \exp\left(-\frac{1}{2\sigma^2}(x^2 + y^2)\right)$$

$$h(x, y) = \frac{h_g(x, y)}{\sum_x \sum_y h_g(x, y)}$$

Figure 4A:
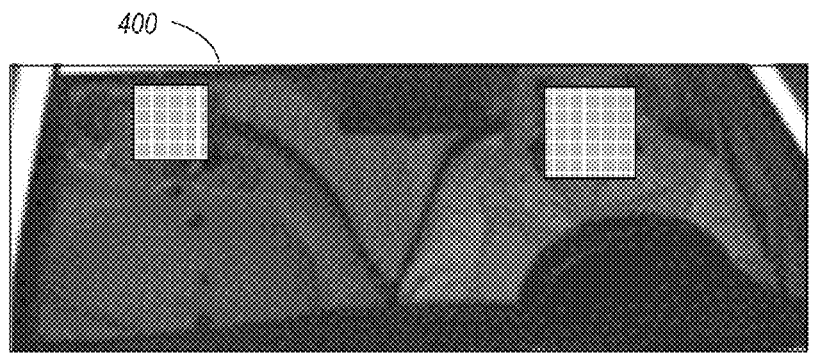
FIGS. 4A-4D are images depicting an original image and subsequent variations to a Gaussian filter applied to the original image in accordance with one embodiment of the subject disclosure.
Figure 4B:
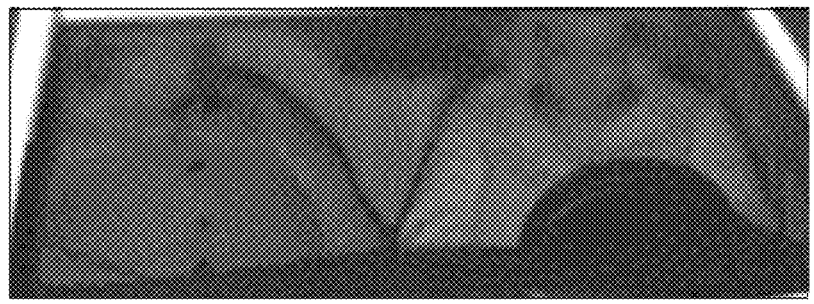
Figure 4C:
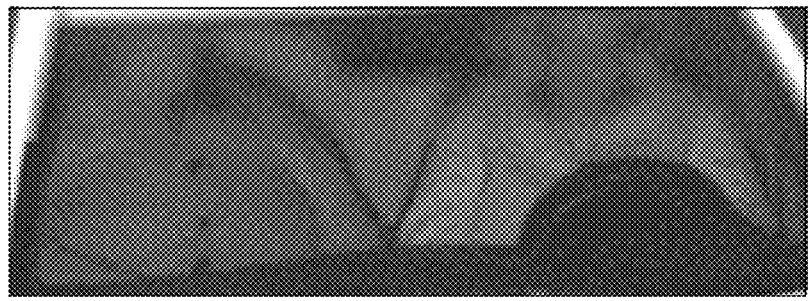
Figure 4D:

FIG. 4A shows the original Image, with a Gaussian filter applied to the original image 400 (with a Gaussian kernel of 2 inches×2 inches and a standard deviation of 0.42 inches in real world dimensions on the object). It is to be appreciated that the boxes shown in FIG. 4A is intended to prevent the identity of the subjects within the vehicle becoming visible as a result of the subject disclosure and it will be understood that FIG. 4A is intended to represent an undistorted, clear, near infrared image 400 of a windshield region 148 according to the embodiments discussed herein. FIG. 4C depicts a Gaussian filtered version of the image 400 of FIG. 4A with a kernel size of 2 inches×2 inches and a standard deviation of 1.5 inches, whereas FIG. 4D depicts the same size kernel having a standard deviation of 2.15 inches. Thus, FIGS. 4B-4D shows the Gaussian filtered image 400 of FIG. 4A, using various kernel sizes and standard deviation (in terms of inches). It will be appreciated, however, that Gaussian filtering does not respect the natural boundaries of objects and causes spatial distortion.

The anisotropic filtering module 156 is configured to perform a filtering technique having intra-region smoothing as opposed to inter-region smoothing (Gaussian). The anisotropic filtering module performs anisotropic filtering, on a detected face or portion of extracted windshield region 148 from a captured image 140. The scale space technique can be used to generate coarser resolution images by convolving the original image with a Gaussian kernel of variance t as shown in Eq. (2).

$$I(x,y,t) = I_o(x,y) * G(x,y,t) \quad (2)$$

It will be appreciated that this one parameter family of images can be equivalently derived as the solution of heat equation, Eq. (3), (with the initial condition $I(x,y,0) = I_o(x,y)$, the original image)

$$I_t = \Delta I = \text{div}(\nabla I) = (I_{xx} + I_{yy}) \quad (3)$$

where div indicates the divergence operator, and with $\nabla$ and $\Delta$ respectively the gradient and Laplacian operators.

In order to encourage intra-region smoothing in preference to inter-region smoothing, diffusion equation can be modified as shown in Eq. (4)

$$I_t = \Delta I = \text{div}(c(x,y,t)\nabla I) = (I_{xx} + I_{yy}) \quad (4)$$

where c(x,y,t) is the diffusion coefficient that is assumed to indicate the locations of the boundaries. It should be noted that, when c(x,y,t) is assumed a constant, then Eq. (4) reduces to the isotropic heat equation. By setting the diffusion coefficient to 1 in the interior of each region and 0 at the boundaries, blurring would take place separately in each region with no interaction between regions. The region boundaries would remain sharp. Accordingly, the methodology employed via this embodiment maintains the overall shape of the face while smoothing inside of the face region. In this implementation, (t) is the iteration parameter that indicates the amount of smoothing.

Figure 5A:
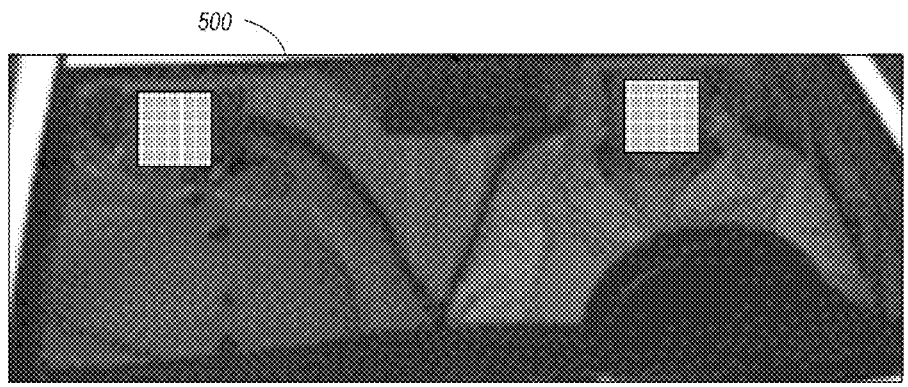
FIGS. 5A-5B are images corresponding to an original image and a redacted original image with an applied anisotropic filter in accordance with one embodiment of the subject disclosure.
Figure 5B:
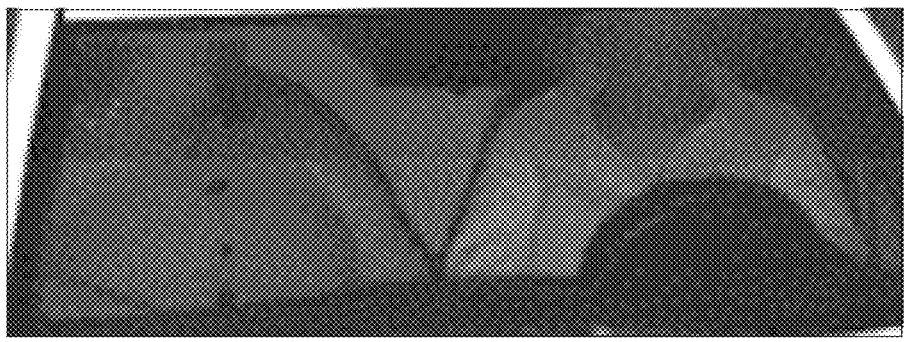

FIG. 5A depicts an original image 500, with boxes covering the actual faces of the passengers of the vehicle 142. It is to be appreciated that the boxes shown in FIG. 5A is intended to prevent the identity of the subjects within the vehicle 142 becoming visible as a result of the subject disclosure and it will be understood that FIG. 5A is intended to represent an undistorted, clear, near infrared image 500 of a windshield region 148 according to the embodiments discussed herein. FIG. 5B depicts an anisotropic filtered original image with a number of iterations (t) is set to 40.

Returning to FIG. 1, the computer system 102 may include one or more input/output (I/O) interface devices 122 and 124 for communicating with external devices. The I/O interface 122 may communicate, via communications link 130, with one or more of a display device 126, for displaying information such as redacted images 141, search results, object identification, video frame stills, queries, and the like, and a user input device 128, such as a keyboard or touch or writable screen, for inputting text, and/or a cursor control device, such as a mouse, trackball, or the like, for communicating user input information and command selections to the processor 104.

The various components of the computer system 102 associated with the face redaction system 100 may all be connected by a data/control bus 125. The processor 104 of the computer system 102 is in communication with associated data storage device 132 via a communications link 134 coupled to the I/O interface 122. A suitable communications link 134 may include, for example, the public-switched telephone network, a proprietary communications network, infrared, optical, or other suitable wired or wireless data communications channel. The data storage device 132 is capable of implementation on components of the computer system 102, e.g., stored in local memory 106, i.e., on hard drives, virtual drives, or the like, or on remote memory accessible to the computer system 102.

The associated data storage device 132 corresponds to any organized collection of data (e.g., video files, binary outputs, kernels, objects, etc.) used for one or more purposes. Implementation of the associated data storage device 132 is capable of occurring on any mass storage device(s), for example, magnetic storage drives, a hard disk drive, optical storage devices, flash memory devices, or a suitable combination thereof. The associated data storage 128 may be implemented as a component of the computer system 102, e.g., resident in memory 106, or the like. In one embodiment, the associated data storage device 132 may redacted images 141 output by the face redaction unit 120 from images 140 acquired by the image acquisition unit 110 from the camera 136. The data storage device 132 may further store additional data, information, rules, policies, account information, and the like, for use during enforcement of HOV regulations.

It will be appreciated that the face redaction system 100 for windshield images illustrated in FIG. 1 is capable of implementation using a distributed computing environment, such as a computer network, which is representative of any distributed communications system capable of enabling the exchange of data between two or more electronic devices. It will further be appreciated that such a computer network includes, for example and without limitation, a virtual local area network, a wide area network, a personal area network, a local area network, the Internet, an intranet, or any suitable combination thereof. Accordingly, such a computer network comprises physical layers and transport layers, as illustrated by various convention data transport mechanisms, such as, for example, Token-Ring, Ethernet, or other wireless or wire-based data communication mechanisms. Furthermore, while depicted in FIG. 1 as a networked set of components, the systems and methods discussed herein are capable of implementation on a stand-alone device adapted to perform the methods described herein.

The computer system 102 may include a computer server, workstation, personal computer, cellular telephone, tablet computer, pager, combination thereof, or other computing device capable of executing instructions for performing the exemplary method. According to one example embodiment, the computer system 102 includes hardware, software, and/ or any suitable combination thereof, configured to interact with an associated user, a networked device, networked storage, remote devices, or the like.

The memory 106 may represent any type of non-transitory computer readable medium such as random access memory (RAM), read only memory (ROM), magnetic disk or tape, optical disk, flash memory, or holographic memory. In one embodiment, the memory 106 comprises a combination of random access memory and read only memory. In some embodiments, the processor 104 and the memory 106 may be combined in a single chip. The network interfaces 122 and/or 124 may allow the computer system 102 to communicate with other devices via a computer network, and may comprise a modulator/demodulator (MODEM). Memory 106 may store data processed in the method as well as the instructions for performing the exemplary method.

The digital processor 104 can be variously embodied, such as by a single core processor, a dual core processor (or more generally by a multiple core processor), a digital processor and cooperating math and/or graphics coprocessor, a digital controller, or the like. The digital processor 104 in addition to controlling the operation of the computer system 102, executes the instructions 108 stored in the memory 106 for performing the method outlined in FIG. 6.

The term "software," as used herein, is intended to encompass any collection or set of instructions executable by a computer or other digital system so as to configure the computer or other digital system to perform the task that is the intent of the software. The term "software," as further used herein, is intended to also encompass such instructions stored in storage mediums, such as RAM, a hard disk, optical disk, or so forth, and is intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 6:
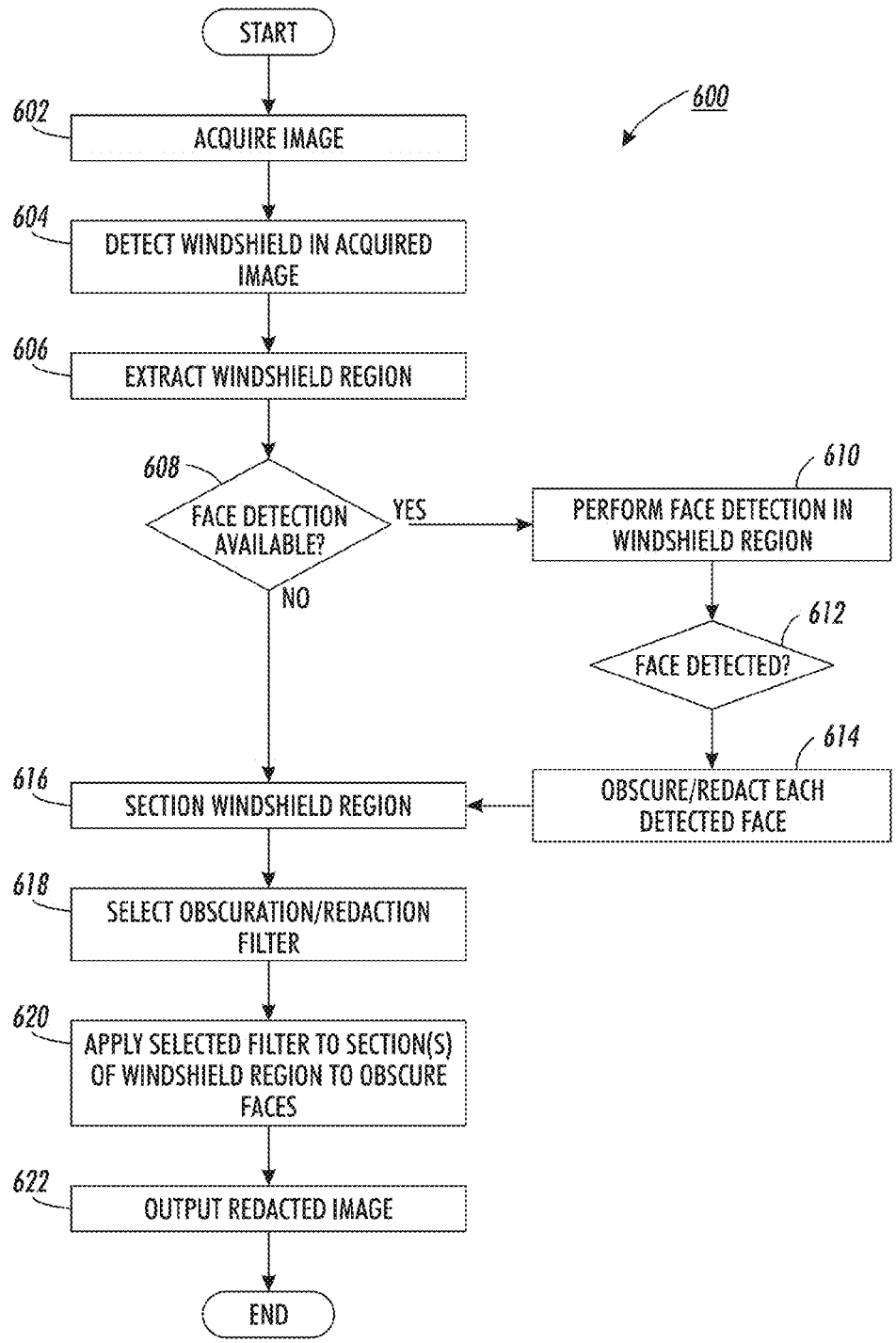
FIG. 6 is a flowchart illustrating a method for redacting faces in a windshield image according to one embodiment of the subject disclosure.

Turning now to FIG. 6, there is shown a flowchart 600 depicting an exemplary embodiment of a method for redacting faces in a windshield image in accordance with one aspect of the subject disclosure. The methodology of FIG. 6 begins at 602, whereupon an image 140 is acquired from an image capture device 136 of a vehicle 142 transiting an HOV lane 144. As discussed above, the image capture device 136 may be implemented as a near infrared (NIR) camera or other suitable device. It will be appreciated that other image capturing devices operating outside of the visible light spectrum and not affected by environmental conditions, e.g., low light, glare, rain, snow, etc., may also be utilized in accordance with the systems and methods set forth herein.

At 604, the windshield 146 of the vehicle 142 is detected via the windshield detection unit 112 in accordance with the systems and methods set forth in U.S. Patent Application Publication No. 2015/0286883 A1, published Oct. 8, 2015, entitled "ROBUST WINDSHIELD DETECTION VIA LANDMARK LOCALIZATION," by Xu et al. The windshield region 148 is then extracted from the detected windshield 146 at 606. As discussed in greater detail above, FIGS. 2A-2C illustrate the aforementioned windshield detection algorithm in operation with respect to the subject embodiments. FIG. 2A shows an original image 200. FIG. 2B illustrates an operation of the windshield detection algorithm, such that the front windshield 146 is detected, with the extracted windshield region 148 illustrated by the rectangular box. FIG. 2C shows the dark trapezoidal shape shown in black pixels denoting the upper windshield region 149 which typically contains any faces of the driver and/or passenger. As illustrated in FIG. 2C, the windshield region 148 may be divided into an upper windshield region 149 and a lower windshield region 151, wherein the upper windshield region 149 corresponds to the portion of the windshield region 148 most likely to contain the face(s) of the driver and/or passenger.

A determination is then made at 608 whether face detection is available, i.e., whether a face detection unit 118 is available. Upon a positive determination, operations proceed to 610. A facial detection methodology is then implemented at 610 via the facial detection unit 118 of the face redaction system 100 for windshield images. The well known Viola-Jones method of face detection can be used including Haar-like features and an Adaboost based classifier. In addition the method described in: Xiangxin Zhu and Deva Ramanan, "Face Detection, Pose Estimation, and Landmark Localization in the Wild," 2012 CVPR can also be used for face detection. It will be appreciated that the face detection unit 118 may further be configured to detect other indicia of the presence or absence of a passenger in the vehicle 142 (the presence of the driver being known), such as, for example, seat belts, car seats, etc.

Figure 8:
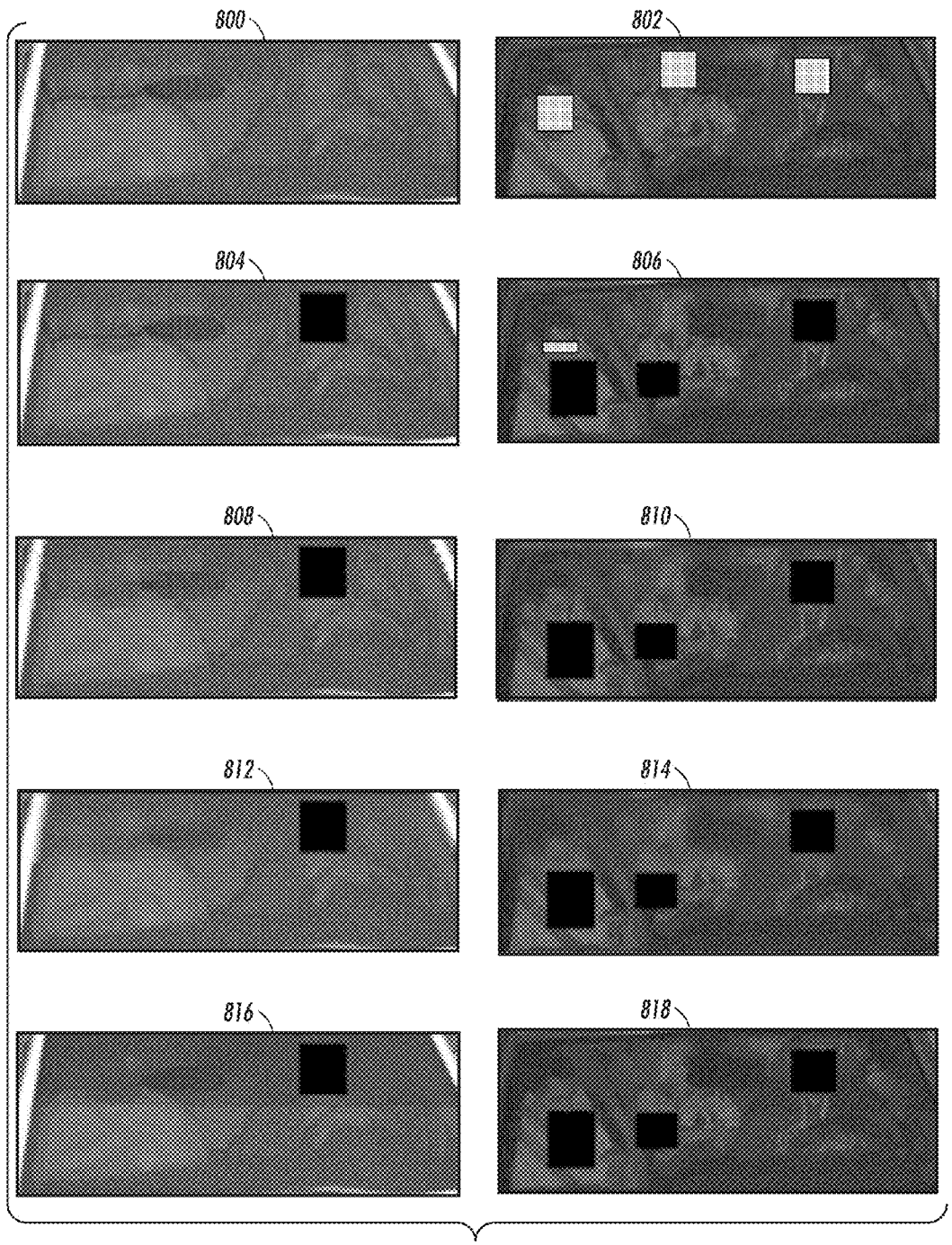
FIG. 8 is a set of images depicting original images and facial redaction according to varying embodiments of the method for redacting faces in windshield images described herein.

At 612, a determination is made whether one or more faces are detected in the captured image 140 by the facial detection unit 118. Upon a determination that one or more faces are detected in captured image 140, operations proceed to 614, whereupon each detected face is redacted/obscured via the face redaction unit 120. An example of such redaction is depicted in FIG. 8, as discussed below.

After redaction of detected faces, or upon a determination at 608 that no detection is available or 612 that no faces are detected, operations proceed to 616, whereupon the extracted windshield region 148 is sectioned. It will be appreciated that the sectioning of the windshield region 148 may be in to two or more sections 150, and for example purposes, reference is made to an upper or top section 149 and a lower or bottom section 151. At 618, a method is selected for obscuring or redacting the section or sections 150 containing faces. It will be appreciated that the method, e.g., pixilation 152, Gaussian 154, anisotropic 156, may be selected in advance or after capture but prior to review or storage of the image 140. Furthermore, the subject systems and methods enable spatially varying application of the selected filter 152-156, such that the amount of obscuration gradually decreases from the top section 149 down to the bottom section 151 based upon preselected factors (as discussed above).

The selected filter 152, 154, or 156 is then applied to the section or sections 150 of the windshield region 148 in which a recognizable face may be visible at 620. It will be appreciated that the obscuration performed on the section 150 at 620 will not affect the previous redaction (if any) performed at 614. Thereafter, at 622, a redacted image 141 with redacted faces and/or windshield regions 149, 151, is output to storage 132, to display 126 for enforcement, or the like.

Figure 7:
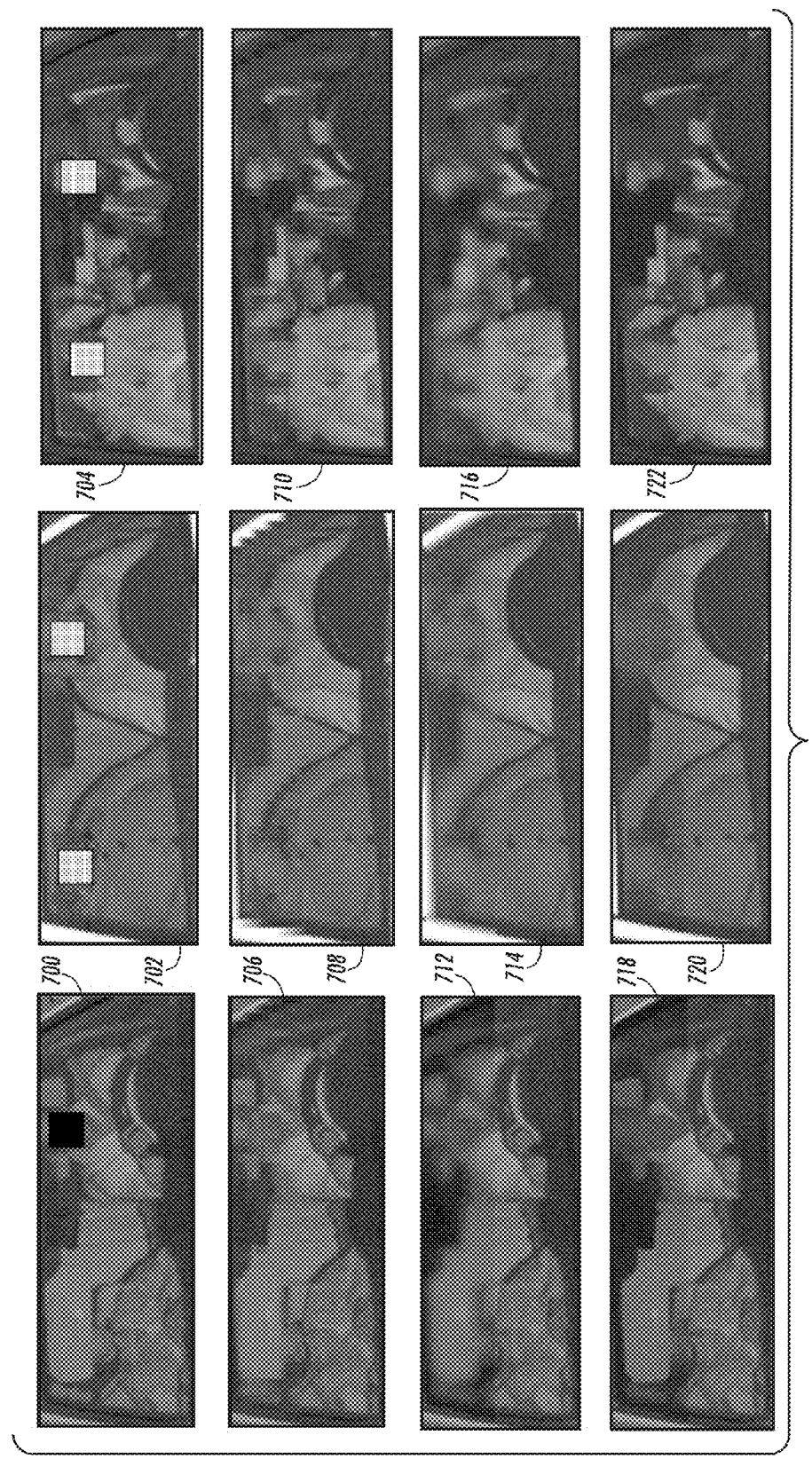
FIG. 7 is a set of images depicting original images and various corresponding facial redaction images according to varying embodiments of the method for redacting faces in windshield images described herein.

Turning now to FIG. 7, there is shown original images 700, 702, and 704. It should be noted that to preserve the privacy of the occupants depicted in the original images 700-704, the instant disclosure includes patterned boxes to hide the faces thereof. Such patterned boxes are place on the images 700, 702, and 704 to protect the identity of the occupants and are not a result of the systems and methods discussed herein. FIG. 7 further shows the results of pixilation technique for a mask of size 4×2 in the images 706, 708, and 710. Images 712, 714, and 714 show Gaussian filtering results for each of the acquired images 140. Images 718, 720, and 722 are shown in FIG. 7 reflecting application of the anisotropic filtering applied to the originally captured images 700, 702, and 704. It will be appreciated that FIG. 7 denotes the face redaction results following steps 602-608 and 616-622, i.e., no face detection unit 118 was used or the face detection unit 118 was unable to locate any faces in the image 140.

FIG. 8 presents the face redaction results following steps 602-622. That is, FIG. 8 illustrates an example result when at least one face is detected by the face detection unit 118. Original images 800 and 802 are shown for reference purposes, with the faces therein obscured via patterned boxes to prevent identification within the subject disclosure of the occupants. Images 804 and 806 respectively show the obscuration of faces detected by the face detection unit 118, i.e., steps 610 through 614. As shown in images 804 and 806, obscuration is obtained via placement of black boxes over the detected faces of the occupants. It will be appreciated that the face detection unit 118 misses identification of a face in both image 800 and image 802 due to illumination conditions. Images 808 and 810 illustrate the obscuration or redaction of the remaining areas of the windshield section 149 of the region 148 that are not already obscured. The obscuration technique used on images 808 and 810 is performed via the pixilation module 152. Images 812 and 814 illustrate the obscuration or redaction of the remaining areas of the images 800 and 802 using Gaussian filtering performed by the Gaussian filtering unit 154 of the computer system 102. Images 816 and 818 respectively illustrate the face redacted images 804 and 806 further having the remaining areas of the section 149 or region 148 obscured by the anisotropic filtering module 156 using anisotropic filtering. It should be noted that the black boxes used by the face redaction unit 118 are not further modified by other obscuration techniques in images 808-818.

The method illustrated in FIG. 6 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 6, can be used to implement the method estimating origins and destinations for users of a transportation system.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system configured to perform redaction of a face in a windshield within an image comprising:
 a data processing device including a processor; and
 a processor-usable medium embodying computer code, the processor-usable medium in communication with the data processing device, the computer program code comprising instructions executable by the processor and configured for:
  extracting a windshield region from an image captured in a non-visible wavelength by an associated image capture device,
  detecting at least one face via an associated face detection unit within the extracted windshield region, redacting the at least one detected face in the extracted windshield region, selectively applying an obscuration process to at least a portion of the extracted windshield region subsequent to the redacting of the at least one detected face in the extracted windshield region, and generating a redacted image of the captured image in accordance with the at least one redacted face and the selectively applied obscuration process.

2. The system of claim 1, further comprising instructions executable by the processor and configured for:

detecting a windshield within the captured image via a selected detection process, wherein the windshield region is extracted in accordance with the detected windshield in the captured image.

3. The system of claim 1, wherein the obscuration process is selectively applied to a top portion of the extracted windshield region.

4. The system of claim 3, wherein the obscuration process is selectively applied spatially varying from the top portion of the extracted windshield region to a bottom portion of the extracted windshield region.

5. The system of claim 1, wherein the obscuration process is selected from the group consisting of a pixilation filtering process, a Gaussian filtering process, and an anisotropic filtering process.

6. The system of claim 1, wherein the windshield region is extracted in accordance with a plurality of landmark points of a vehicle in the captured non-visible wavelength image, and wherein the portion of the extracted windshield region for obfuscation is determined in accordance with a set of the landmark points.

7. The system of claim 1, wherein the non-visible wavelength is selected from infrared, near infrared, or far infrared.

8. A computer implemented method for redacting a face in a windshield within an image comprising:

detecting a windshield within an image captured in a non-visible wavelength by an associated image capture device via a selected detection process in accordance with a plurality of landmark points of a vehicle in the image;

extracting a windshield region from the detected windshield within the captured image;

detecting at least one face via an associated face detection unit within the extracted windshield region;

redacting the at least one detected face in the extracted windshield region;

selectively applying an obscuration process to at least a portion of the extracted windshield region subsequent to the redacting of the at least one detected face in the extracted windshield region, the at least a portion determined in accordance with a set of the landmark points; and generating a redacted image of the captured image in accordance with the at least one redacted face and the selectively applied obscuration process.

9. The computer implemented method of claim 8, further comprising sectioning the extracted windshield region into at least a top portion and a bottom portion, wherein the obscuration process is selectively applied to the top portion.

10. The computer implemented method of claim 8, further comprising spatially varying the obscuration process from a top of the windshield region to a bottom of the windshield region.

11. The computer implemented method of claim 8, wherein the obscuration process is selected from the group consisting of a pixilation process, a Gaussian filter process, and an anisotropic filter process.

12. The computer implemented method of claim 11, further comprising sectioning the extracted windshield region into at least a top portion and a bottom portion, wherein the obscuration process is selectively applied to at least the top portion of the extracted windshield region.

13. The computer implemented method of claim 8, further comprising acquiring the image from at least one of an infrared camera, a near infrared camera, or a far infrared camera.

14. A non-transitory computer-usable medium for performing landmark-based image analysis for redacting a face in a windshield within an image, the computer-usable medium embodying a computer program code, the computer program code comprising computer executable instructions configured for:

extracting a windshield region from an image captured in a non-visible wavelength by an associated image capture device process in accordance with a plurality of landmark points of a vehicle in the image;

detecting at least one face via an associated face detection unit within the extracted windshield region; and redacting the at least one detected face in the extracted windshield region;

selectively applying an obscuration process to at least a portion of the extracted windshield region subsequent to the redacting of the at least one detected face in the extracted windshield region, the at least a portion determined in accordance with a set of the landmark points; and generating a redacted image of the captured image in accordance with the at least one redacted face and the selectively applied obscuration process.

15. The non-transitory computer-usable medium of claim 14, further comprising:

detecting a windshield within the captured image via a selected detection process, wherein the windshield region is extracted in accordance with the detected windshield in the captured image.

16. The non-transitory computer-usable medium of claim 15, wherein the obscuration process is selected from the group consisting of a pixilation process, a Gaussian filter process, and an anisotropic filter process.

17. The non-transitory computer-usable medium of claim 16, further comprising sectioning the extracted windshield region into at least a top portion and a bottom portion, wherein the obscuration process is selectively applied to at least the top portion of the extracted windshield region.

* * * * *